United States Patent [19]

Winslow

[11] Patent Number: 4,720,758
[45] Date of Patent: Jan. 19, 1988

[54] LOAD DEPENDENT CURRENT LIMITER FOR THE POWER SUPPLY OF A MULTI-MODULE ELECTRONIC SYSTEM

[75] Inventor: Jeffrey K. Winslow, Portland, Oreg.

[73] Assignee: Tektronix, Inc., Beaverton, Oreg.

[21] Appl. No.: 52,211

[22] Filed: May 15, 1987

Related U.S. Application Data

[63] Continuation of Ser. No. 759,569, Jul. 26, 1985, abandoned.

[51] Int. Cl.$^4$ ................................................ H02H 3/08
[52] U.S. Cl. ........................................ 361/93; 361/18; 323/274
[58] Field of Search .................. 361/18, 87, 93, 98, 361/100, 101; 307/31, 32, 33, 34, 35, 36, 37, 356, 358, 363, 297; 323/267, 273, 274, 275, 276, 277, 281, 297

[56] References Cited

U.S. PATENT DOCUMENTS

| | | | |
|---|---|---|---|
| 3,617,812 | 11/1971 | Deter | 361/87 |
| 4,375,072 | 2/1983 | Rice | 361/93 |
| 4,449,058 | 5/1984 | Feldmann | 361/86 X |

FOREIGN PATENT DOCUMENTS 2469031  5/1981  France ............................... 361/87

OTHER PUBLICATIONS

IBM Technical Disclosure Bulletin, vol. 28, No. 3, Aug. 1985, "Automatic Multi-Level Overcurrent Protection Circuit".

Primary Examiner—A. D. Pellinen
Assistant Examiner—H. L. Williams
Attorney, Agent, or Firm—Francis I. Gray; John Smith-Hill; Robert S. Hulse

[57] ABSTRACT

A load-dependent current limiter for the power supply of a multi-module electronic system has a programming resistor in each module connected between the power supply voltage and a reference bus. The current through each programming resistor is proportional to the current requirements of the module. The voltage of the reference bus, which is proportional to the total current through all the programming resistors, is compared to the voltage developed across a sensing resistor by the total power supply current. When the sense voltage exceeds the reference voltage, indicative of tapping excess power, a signal is sent from the comparator to shutdown the power supply.

7 Claims, 2 Drawing Figures

LOAD DEPENDENT CURRENT LIMITER FOR THE POWER SUPPLY OF A MULTI-MODULE ELECTRONIC SYSTEM

This is a continuation of application Ser. No. 06/759,569 filed July 26, 1985 and now abandoned.

BACKGROUND OF THE INVENTION

1. Field of the Invention

The current invention relates to power supply current limiters, and more particularly to a load-dependent current limiter for the power supply of a multi-module electronic system.

2. Description of the Prior Art

Power supplies for an electronic system are designed to match the power needs of each particular system. However, for multi-module electronic systems the power supply must match the power needs of all the modules at once. The result is that when not all the modules are used there is excess power available from the power supply before shutdown. This excess power may be inadvertantly tapped at localized spots due to metal chips or whiskers which might get into the equipment. This excess power then appears as localized heat which can damage the modules, or even start a fire. These hazards are more pronounced when the electronic system is being serviced.

What is desired is a means for limiting the excess power supply current to a value which will not pose a safety hazard to either equipment users or service personnel.

SUMMARY OF THE INVENTION

Accordingly, the present invention provides a load-dependent current limiter for the power supply of a multi-module electronic system. Each module has a programming resistor connected between the power supply voltage and a reference bus. The voltage of the reference bus is compared with a sense voltage that is substantially representative of the total power supply current. When the sense voltage exceeds the reference bus voltage, indicative of tapping excess power, a signal is sent to shut down the power supply.

Objects, advantages and novel features of the present invention will be apparent from the following detailed description when read in conjunction with the appended claims and attached drawings.

DESCRIPTION OF THE PREFERRED EMBODIMENT

Figure 1:
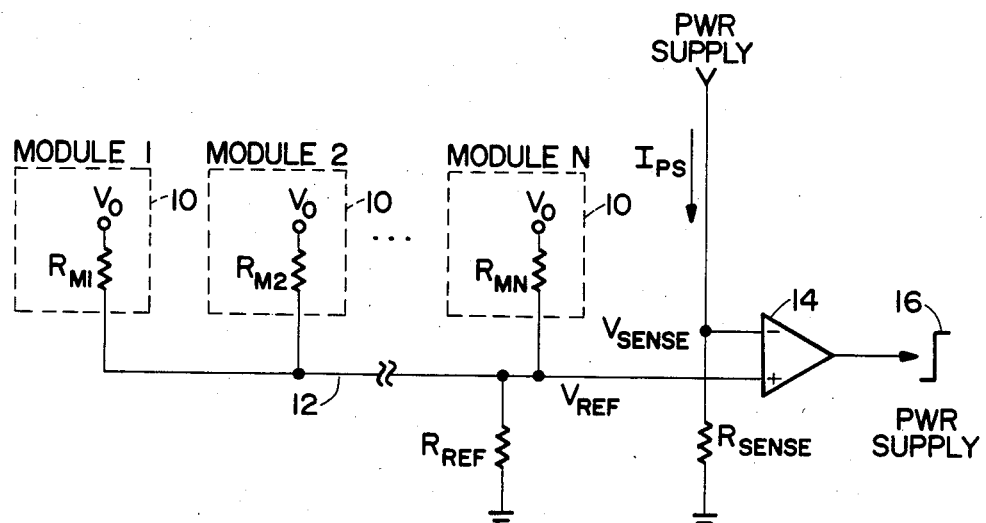
FIG. 1 is a schematic view of a load-dependent current limit according to the present invention.

Referring now to FIG. 1 a circuit for providing load-dependent current limiting of a power supply 8 for a multi-module electronic system is shown. A plurality of electronic modules $10_x$ each have a programming resistor $R_{mx}$ between a power supply output voltage $V_o$ and a reference bus 12. A current is developed through a reference resistor $R_{ref}$ from each module resulting in a reference voltage $V_{ref}$. The programming resistor $R_{mx}$ is chosen so that the current through $R_{mx}$ is proportional to the current required by that module 10 from $V_o$. If the programming resistors $R_{mx}$ are much larger than $R_{ref}$, the total current flowing through $R_{ref}$ closely approximates a current identically proportional to the total required power supply current. A comparator 14 compares the reference voltage $V_{ref}$ with the voltage $V_{sense}$ developed across a sensing resistor $R_{sense}$ by the output current $I_{ps}$ of the power supply. If $V_{sense} > V_{ref}$, the comparator 14, a high gain amplifier, sends a signal 16 to the power supply 8 to indicate an overcurrent fault. Thus, if the output current $I_{ps}$ exceeds the level required by the sum of the modules being powered, the power supply responds accordingly.

Figure 2:
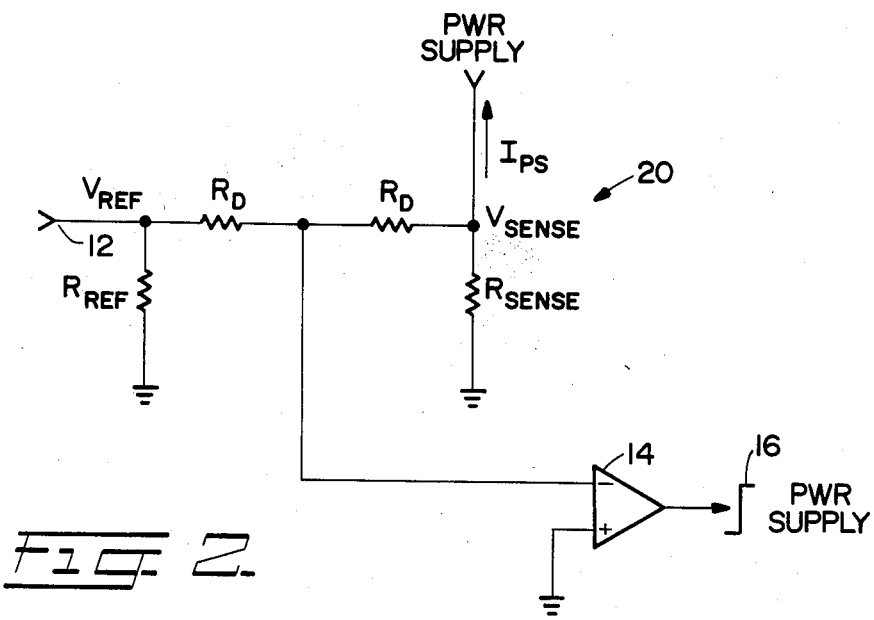
FIG. 2 is a schematic view of an alternate embodiment of a comparator circuit for the present invention.

An alternative sensing circuit 20 is shown in FIG. 2. The voltages $V_{ref}$ and $V_{sense}$ are summed by resistors $R_d$. Again if $V_{sense} > V_{ref}$, the negative input of the comparator 14 falls below ground and the comparator signals the power supply.

The reference resistor $R_{ref}$ may be replaced by an operational amplifier to sum the currents from the programming resistors $R_{mx}$. The constant of proportionality is set by a feedback resistor on the operational amplifier.

For a digitally-controlled power supply each module 10 communicates a digitally-encoded signal to the power supply which represents the current required by that module. Also start-up current requirements, voltage levels and/or tolerances, and any other information affecting supply operation may be communicated. If any of these requirements varied significantly with time, that fact may also be easily communicated and acted upon in a similar manner.

Thus, the present invention provides a current limit proportional to the expected load so that excess available power from the power supply output is minimized for all loads.

What is claimed is:

1. Electronic apparatus comprising:

a plurality of load modules each comprising a load element for utilizing current supplied to the load module and a programming element for generating a signal representative of the current requirement of the load element, a power supply circuit connected to the load modules for supplying current thereto, the power supply circuit having a control terminal for receiving a shutdown signal and being operative to interrupt the supply of current to the load modules on receipt of a shutdown signal, reference means for utilizing the signals generated by the programming elements of the respective load modules to generate a signal representative of the total current requirement of the load elements of all of said modules, sensing means for generating a signal that is representative of the total current output of the power supply circuit, and comparison means for utilizing the signals generated by the reference means and the sensing means to compare the total current requirement of the load elements of all of said modules with the total current supplied to the load modules by the power supply circuit, the comparison means providing a shutdown signal to the control terminal of the power supply circuit when an overcurrent condition is indicated.

2. Electronic apparatus according to claim 1, wherein the power supply circuit has first and second power supply terminals for supplying current to the load modules and the programming element of each load module comprises a programming resistor which is connected between the first power supply terminal of the power supply circuit and a reference bus.

3. Electronic apparatus according to claim 2, wherein the reference means comprise a reference resistor connected between the reference bus and the second power supply terminal of the power supply circuit, the sensing means comprise a sensing resistor through which a current substantially equal to the total current supplied by the power supply circuit flows, and the comparison means comprise a comparator having a first input terminal connected to the reference bus, a second input terminal connected to the sensing resistor, and an output terminal connected to the control terminal of the power supply circuit.

4. Apparatus according to claim 2, wherein the reference means comprise a reference resistor connected between the reference bus and the second power supply terminal of the power supply circuit, the sensing means comprise a sensing resistor through which a current substantially equal to the total current supplied by the power supply circuit flows, and the comparison means comprise summing means for summing a reference voltage across the reference resistor and a sense voltage across the sensing resistor to produce an essentially zero voltage output and means for detecting when said essentially zero voltage output increases due to an overcurrent condition and providing a shutdown signal to the control terminal of the power supply circuit.

5. Apparatus according to claim 4, wherein the summing means comprise a resistive voltage divider network connected between the reference resistor and the sensing resistor.

6. Apparatus according to claim 2, wherein the reference means comprise a reference resistor connected between the reference bus and the second power supply terminal of the power supply circuit, the resistance value of the reference resistor being much less than the resistance value of each of the programming resistors.

7. Apparatus according to claim 3, wherein the resistance value of the reference resistor is much less than the resistance value of each of the programming resistors.

* * * * *